(12) United States Patent
Brusadelli et al.

(10) Patent No.: US 8,807,179 B2
(45) Date of Patent: Aug. 19, 2014

(54) BEVERAGE VENDING MACHINE

(75) Inventors: Ettore Brusadelli, Brivio (IT);
Alessandro Manzoni, San Giovanni Bianco (IT)

(73) Assignee: N&W Global Vending S.p.A., Valbrembo (IT)

( * ) Notice: Subject to any disclaimer, the term of this patent is extended or adjusted under 35 U.S.C. 154(b) by 947 days.

(21) Appl. No.: 12/992,600

(22) PCT Filed: May 14, 2009

(86) PCT No.: PCT/IB2009/005588
§ 371 (c)(1),
(2), (4) Date: Mar. 7, 2011

(87) PCT Pub. No.: WO2009/138863
PCT Pub. Date: Nov. 19, 2009

(65) Prior Publication Data
US 2011/0146838 A1  Jun. 23, 2011

(30) Foreign Application Priority Data

May 15, 2008 (IT) .............................. TO2008A0365

(51) Int. Cl.
*B65B 43/42* (2006.01)
(52) U.S. Cl.
USPC ......................................... 141/174; 141/165

(58) Field of Classification Search
CPC ................................ B65B 43/54; B65B 43/60
USPC ........... 141/168, 171, 173, 165, 174; 221/210
See application file for complete search history.

(56) References Cited

U.S. PATENT DOCUMENTS 3,530,907 A * 9/1970 Slass ............................ 141/167
2003/0201279 A1   10/2003 Taguchi

FOREIGN PATENT DOCUMENTS

JP           02 081297        3/1990

OTHER PUBLICATIONS

International Search Report and Written Opinion of the International Searching Authority as issued in International Application No. PCT/IB2009/005588 filed May 14, 2009.

* cited by examiner

*Primary Examiner* — Jason K Niesz
(74) *Attorney, Agent, or Firm* — Dorsey & Whitney LLP

(57) ABSTRACT

A beverage vending machine having a pickup compartment accessible from the outside and having a beverage mixing station; a beverage dispensing device having at least one outlet located at the mixing station in a fixed position facing the pickup compartment; a first member for feeding a cup into position beneath the outlet; and a second member which is movable, past the outlet and with respect to the first member, to and from a position separating the outlet from the pickup compartment.

15 Claims, 9 Drawing Sheets

BEVERAGE VENDING MACHINE

TECHNICAL FIELD

The present invention relates to a beverage vending machine.

More specifically, the present invention relates to a beverage vending machine of the type comprising a pickup compartment accessible from the outside and having a beverage mixing station; beverage dispensing means having at least one outlet located at the mixing station and in a fixed position facing the compartment; and a member for feeding a cup into position beneath the outlet.

BACKGROUND ART

In known vending machines of the above type, the outlet of the dispensing means normally communicates directly with the inside of the compartment through an opening formed in a top wall of the compartment. Because the mixing station normally also functions as a user cup pickup station, the opening is located for easy access by the user from the outside, which means the outlet of the dispensing means is particularly exposed to acts of vandalism.

DISCLOSURE OF INVENTION

It is an object of the present invention to provide a beverage vending machine of the above type, designed to eliminate the above drawback.

According to the present invention, there is provided a beverage vending machine as claimed in Claim and preferably in any one of the following Claims depending directly or indirectly on claim 1.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
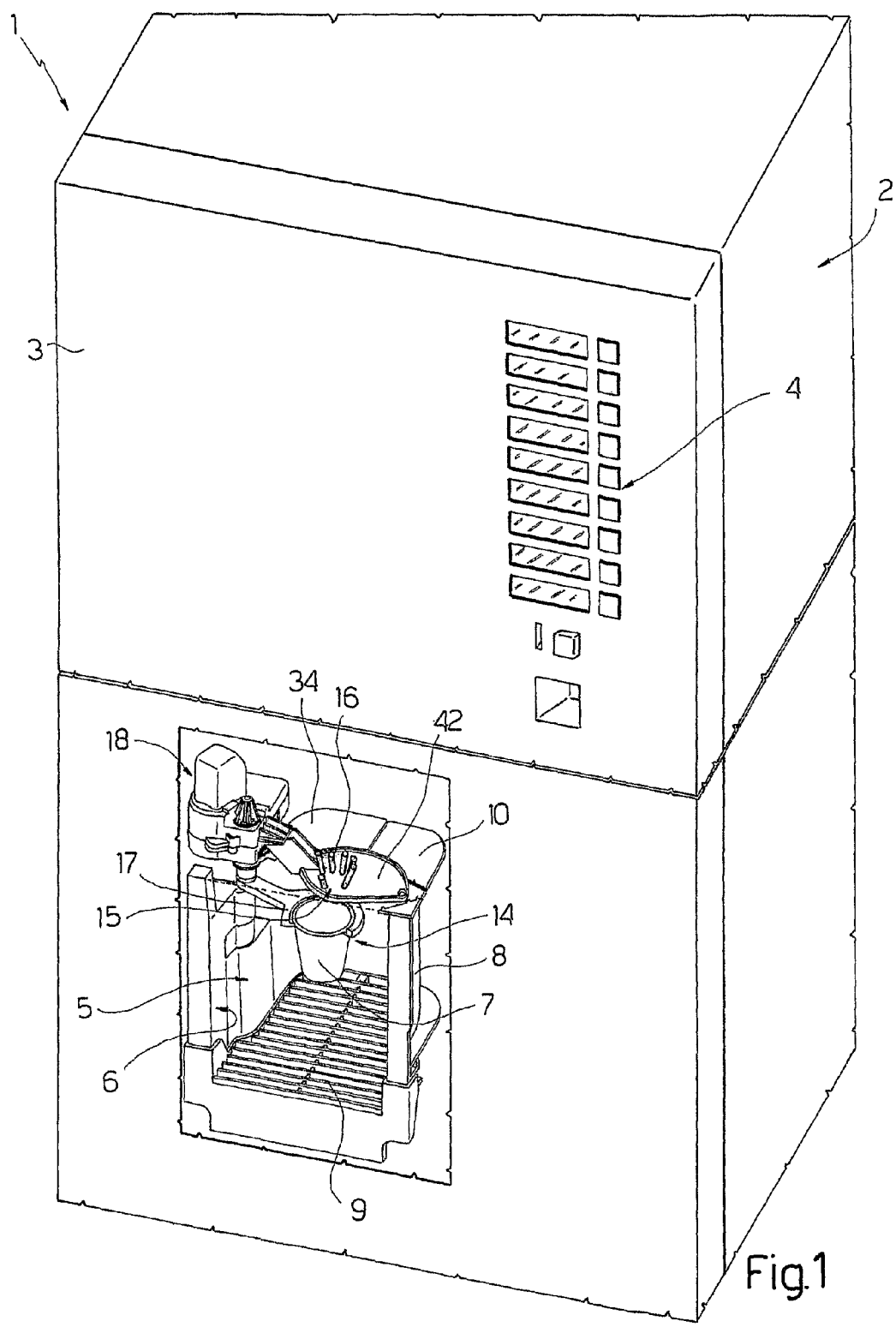
FIG. 1 shows a view in perspective, with parts removed for clarity, of a preferred embodiment of the beverage vending machine according to the present invention.

Number 1 in FIG. 1 indicates as a whole a beverage vending machine comprising a casing 2 closed at the front by a door 3, which has a beverage selection pushbutton panel 4 and, beneath pushbutton panel 4, a pickup compartment 5 accessible from the outside through an opening 6 formed in the outer surface of door 3 and normally closed by a hatch (not shown) made of transparent material, to allow the user to remove a cup 7 containing the selected beverage.

Compartment 5 extends inwards of casing 2 from opening 6, is substantially parallelepiped-shaped, and is bounded by a lateral wall 8, a bottom wall 9 in the form of a grille, and a top wall 10 having two through holes 11 and 12 (FIG. 3) communicating with the inside of casing 2.

More specifically, hole 11 is formed in a rear portion of top wall 10, and defines, in compartment 5, a cup feed station 13 through which cups 7 are fed selectively to compartment 5, after being withdrawn, one at a time by a known feed device (not shown), from the bottom of a stack (not shown) in a store (not shown) located above top wall 10 at hole 11.

Hole 12, on the other hand, is located close to opening 6, and defines, in compartment 5, a beverage mixing station 14. More specifically, hole 12 is formed through wall 10, and faces the outlets 15 of a number of nozzles 16, which define the end portion of a known production unit (not shown) housed inside casing 2 and for dispensing, by means of nozzles 16, the liquid and/or powdered product/s forming the user-selected beverage.

To transfer a cup 7 from cup feed station 13 to mixing station 14, machine 1 comprises a cup-holder 17, which is located just beneath top wall 10, extends from lateral wall 8 to the centre of compartment 5, and is activated, as described below, by a drive 18 to move, inside compartment 5 and just below top wall 10, in a substantially horizontal plane parallel to top wall 10.

Figure 2:
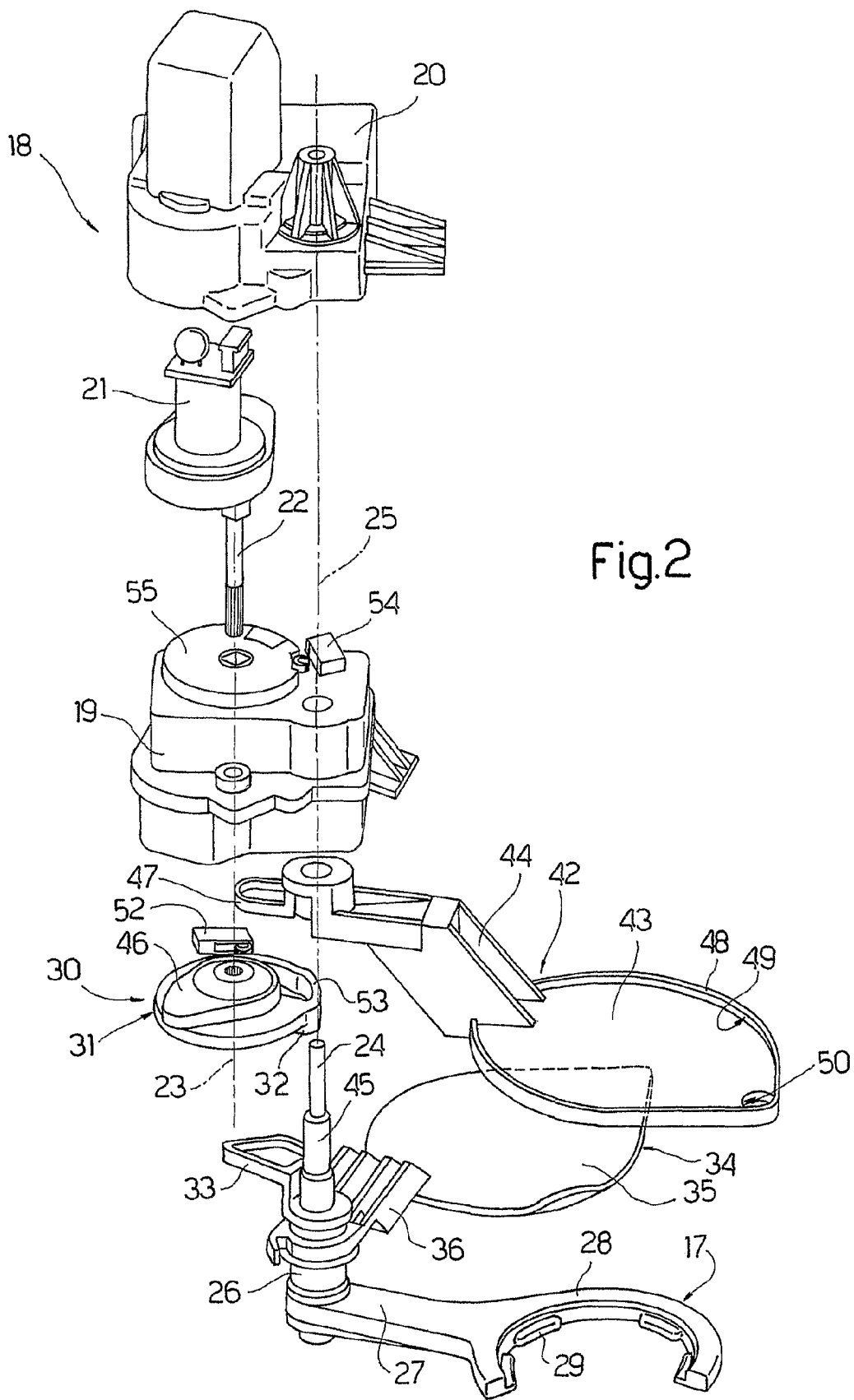
FIG. 2 shows a larger-scale, exploded view in perspective of a detail in FIG. 1.

As shown in FIG. 2, drive 18 forms part of machine 1, is housed inside casing 2, above compartment 5, and comprises a fixed bottom housing 19, and a top housing 20 connected rigidly to bottom housing 19 and housing an electric motor reducer 21, an output shaft 22 of which extends through bottom housing 19 from top housing 20 along a substantially vertical axis of rotation 23.

Cup-holder 17 is fitted in rotary manner to a pin 24, which is fitted, in a fixed position coaxial with an axis 25 parallel to axis 23, through top housing 20 and bottom housing 19, and projects downwards from bottom housing 19. More specifically, cup-holder 17 is fitted to a bottom end portion of pin 24 by a sleeve 26 integral with cup-holder 17 and fitted to pin 24 in axially fixed, angularly free manner with respect to pin 24.

More specifically, cup-holder 17 comprises a rod 27 connected rigidly to sleeve 26 and extending inwards of compartment 5 from sleeve 26; and a C-shaped member 28, which is integral with the free end of rod 27, lies in a horizontal plane crosswise to axes 23 and 25, and is movable by drive 18 between a rest and mixing position (FIGS. 3 and 7), in which C-shaped member 28 is positioned facing hole 12 at mixing station 14, and a cup receiving position (FIGS. 4 and 8), in which C-shaped member 28 is positioned facing hole 11 at cup feed station 13. Accordingly, C-shaped member 28 is shaped and sized to be engaged axially, in the receiving position, by a cup 7, and to retain cup 7 in an upright position by means of a number of appendixes 29 projecting radially from an inner lateral surface of the C-shaped member, and which cooperate with a truncated-cone-shaped lateral wall or an outer radial end flange of cup 7.

C-shaped member 28 also has a lateral opening which, in the rest and mixing position, allows the user to remove cup 7 transversely from C-shaped member 28.

Cup-holder 17 is swung between the rest and mixing position and the receiving position by drive 18, under the control of a central control unit (not shown) of a control unit 30, operation of which is described in detail below, and by a cam transmission device 31 comprising a disk cam 32 fitted to a free end portion of shaft 22 and which controls a cam follower 33 fitted to sleeve 26 and therefore integral with cup-holder 17.

As shown in FIGS. 1, 2, 11 and 12, machine 1 also comprises a shutter 34 for closing hole 11 when a cup 7 is not being fed to compartment 5, and so preventing access to the inside of casing 2 through hole 11, to safeguard the store (not shown) of cups 7 and the other devices (not shown) inside machine 1 from acts of vandalism.

Shutter 34 is located just above top wall 10, and comprises a teardrop-shaped plate 35 larger than hole 11; and a supporting arm 36 integral with plate 35 and connected to sleeve 26 to swing plate 35, about axis 25 and as sleeve 26 swings about axis 25, between a normal closed position (FIGS. 3, 7, 12) closing hole 11 and in which plate 35 faces hole 11, and an open position (FIGS. 4, 8, 11) opening hole 11 and in which plate 35 is rotated outwards of hole 11 to allow a cup 7 to drop through hole 11.

Figure 11:
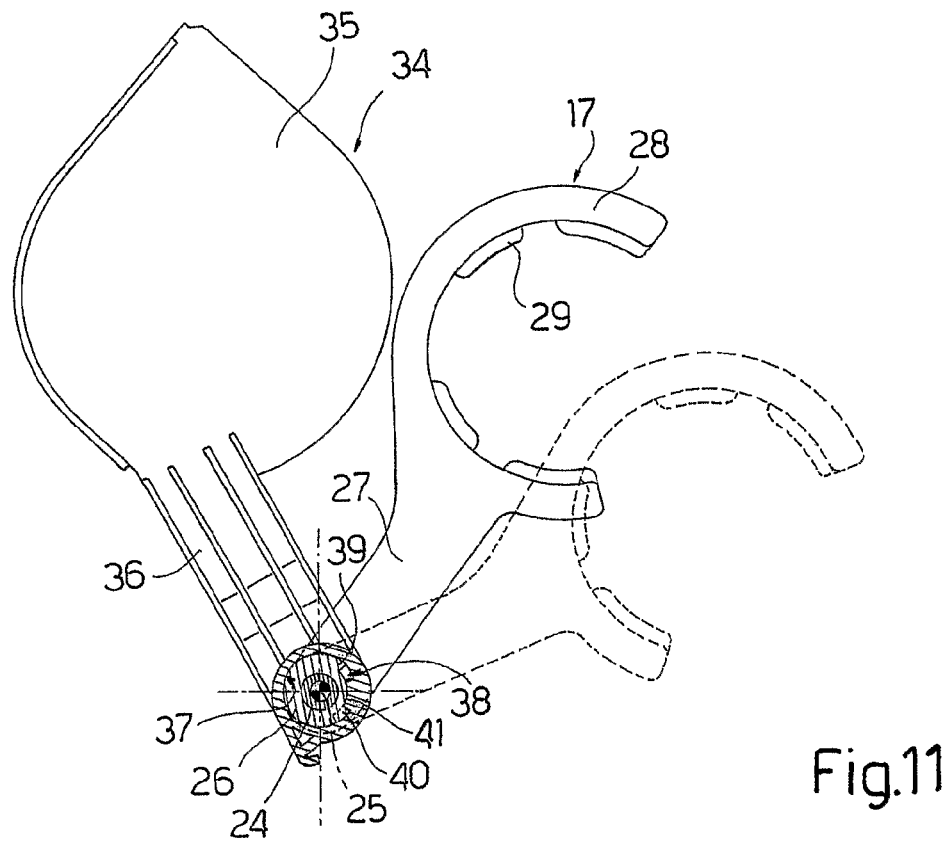
FIGS. 11 and 12 show details of FIGS. 3 and 4 respectively.
Figure 12:
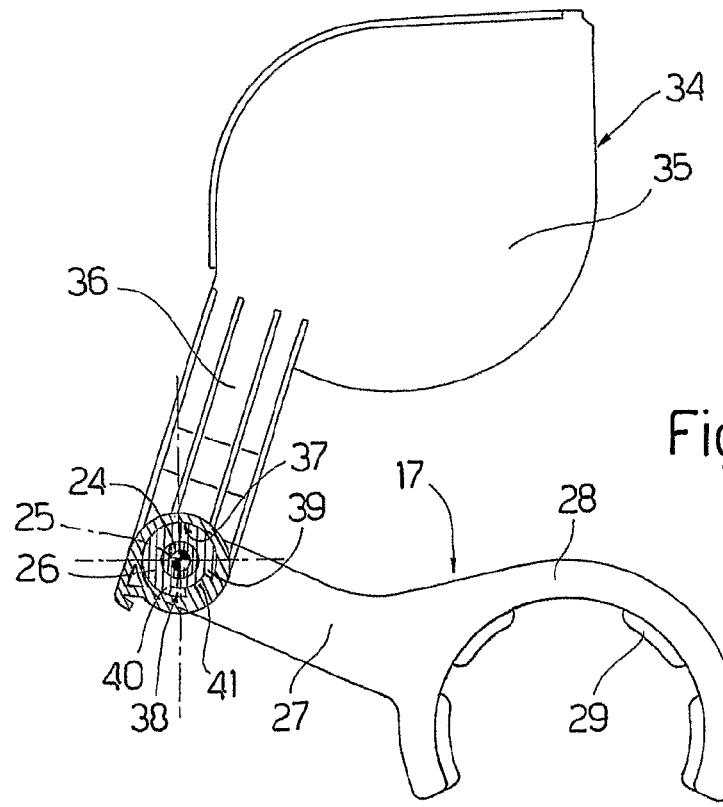

More specifically, and with reference to FIGS. 11 and 12, the free end of arm 36 has a hole 37 coaxial with axis 25 and fitted in rotary manner to a portion of sleeve 26 interposed between rod 27 and cam follower 33, and which has a slot 38 bounded laterally by two radial shoulders 39, 40 and engaged in sliding manner by a tooth 41 integral with arm 36 and projecting radially from the inner surface of hole 37.

Figure 7:
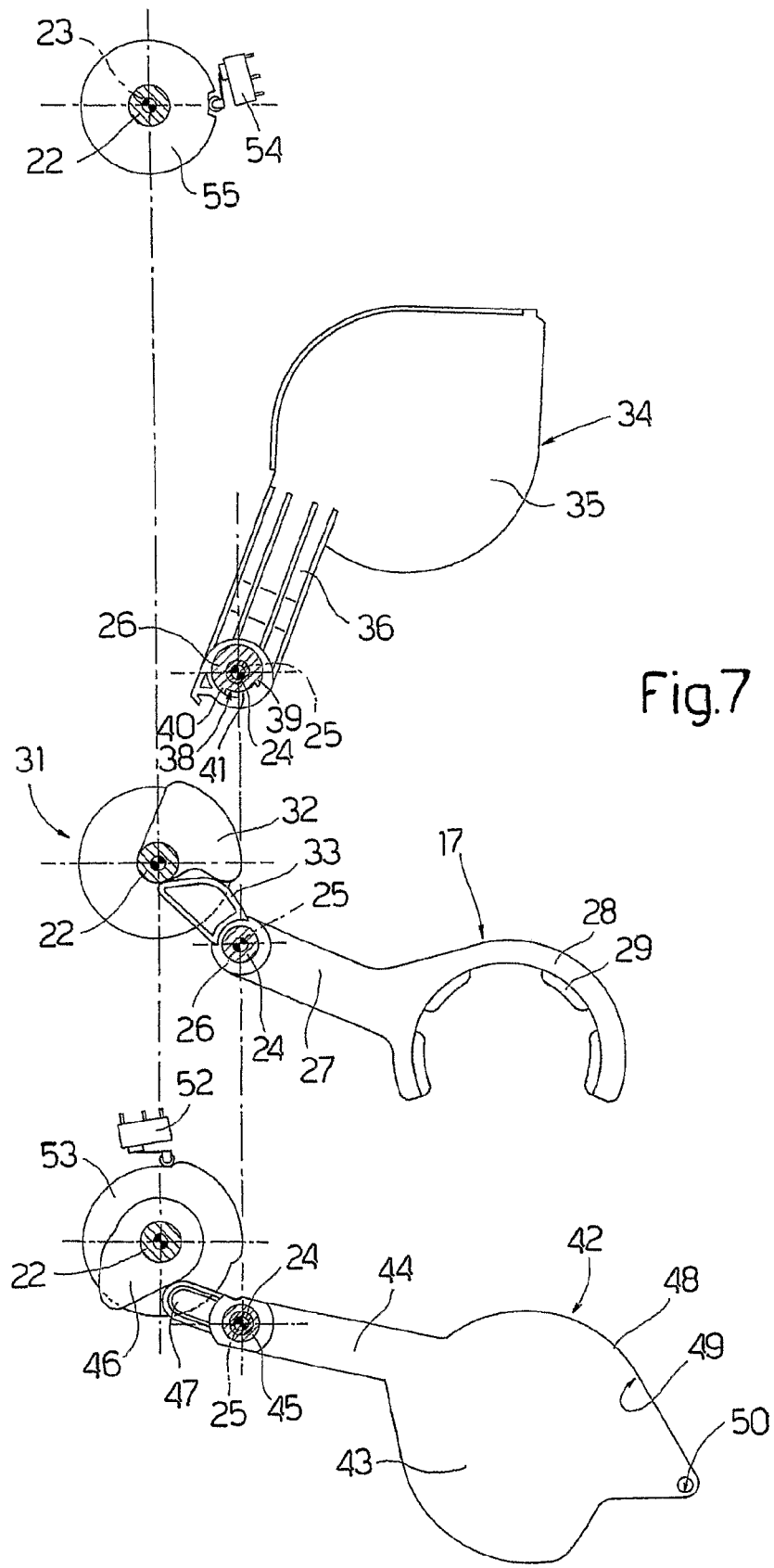
FIGS. 7 to 10 show exploded plan views, with parts removed for clarity, of the FIG. 3-6 detail in respective operating configurations.

As shown in FIGS. 12 and 7, shutter 34 is set to the closed position when cup-holder 17 is in the rest and mixing position; in which position, tooth 41 contacts shoulder 39.

Figure 8:
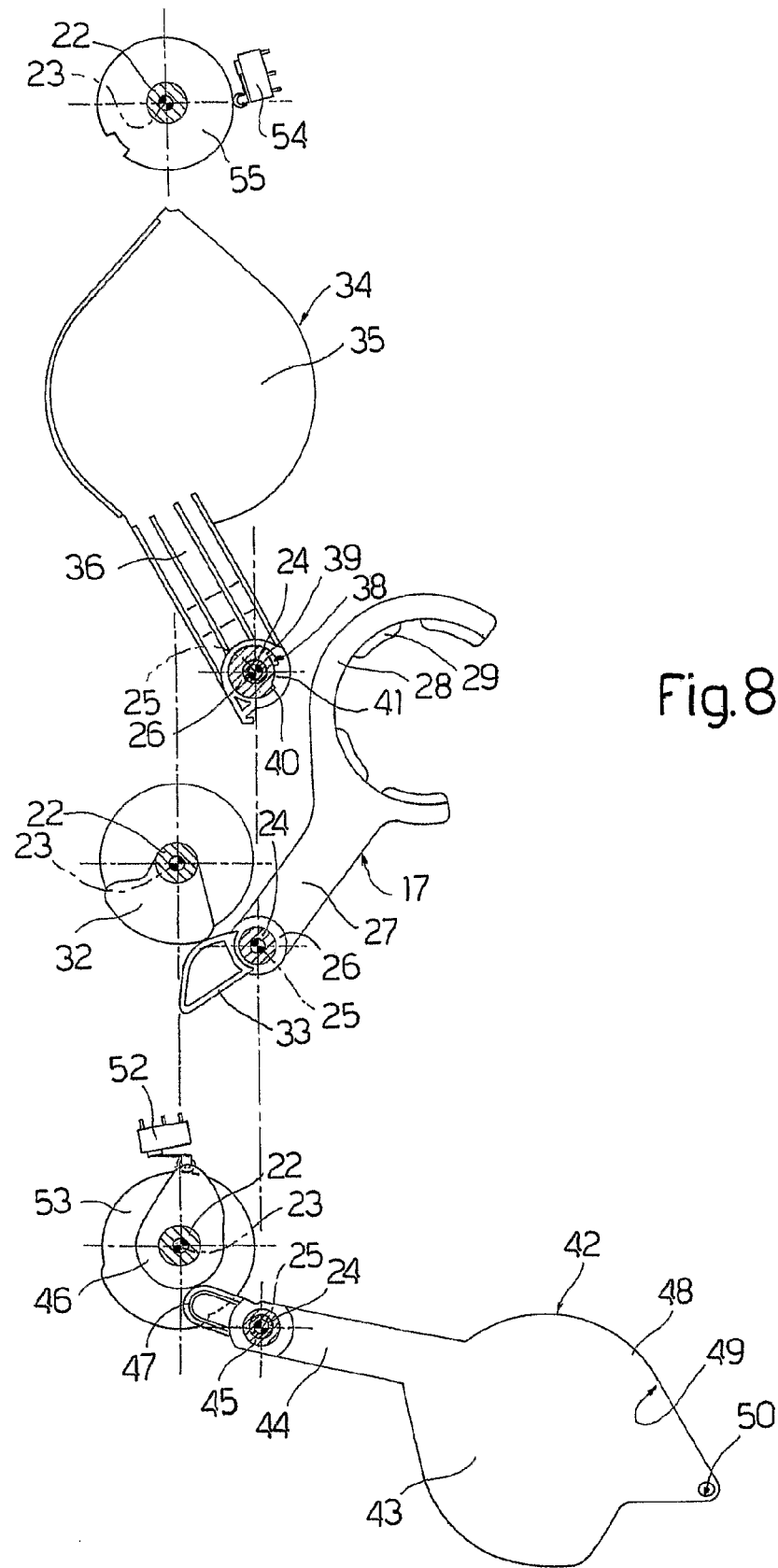

As shown in FIGS. 11 and 8, when sleeve 26 rotates, in use, anticlockwise about axis 25, cup-holder moves from the rest and mixing position to an intermediate position (shown by the dash line in FIG. 11), and shoulder 40 is moved into contact with tooth 41 to connect shutter 34 angularly to sleeve 26.

From this point on, further anticlockwise rotation of sleeve 26 to move cup-holder 17 into the receiving position (shown by the continuous line in FIG. 11) produces an equal rotation of shutter 34 about axis 25 into the open position. Likewise, shutter 34 is restored to the closed position when, after a first portion of the rotation of sleeve 26, shoulder 39 is moved into contact with tooth 41 to connect shutter 34 angularly to sleeve 26.

Figure 3:
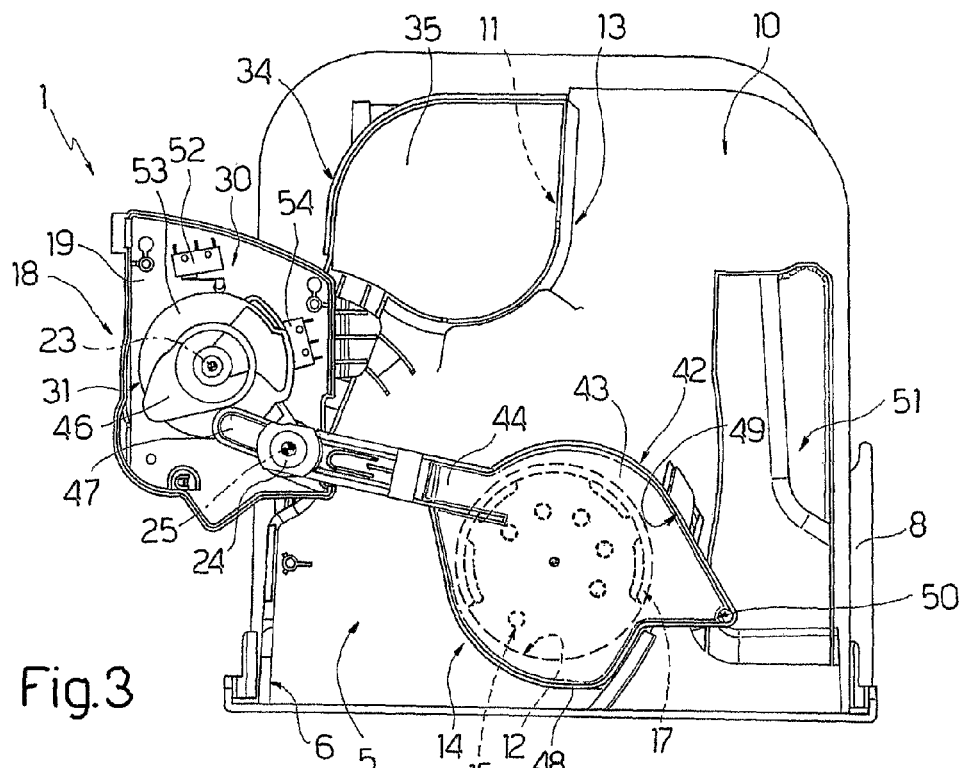
FIGS. 3 to 6 show schematic plan views, with parts replaced for clarity, of a detail in FIG. 1 in respective different operating configurations.

As shown in FIGS. 1, 2 and 3, machine 1 also comprises a guard device 42 for protecting nozzles 16, and which closes hole 12, when nozzles 16 are not working, to prevent access to the inside of casing 2 through hole 12 and so safeguard nozzles 16 and the other devices (not shown) inside machine 1 from acts of vandalism.

Figure 5:
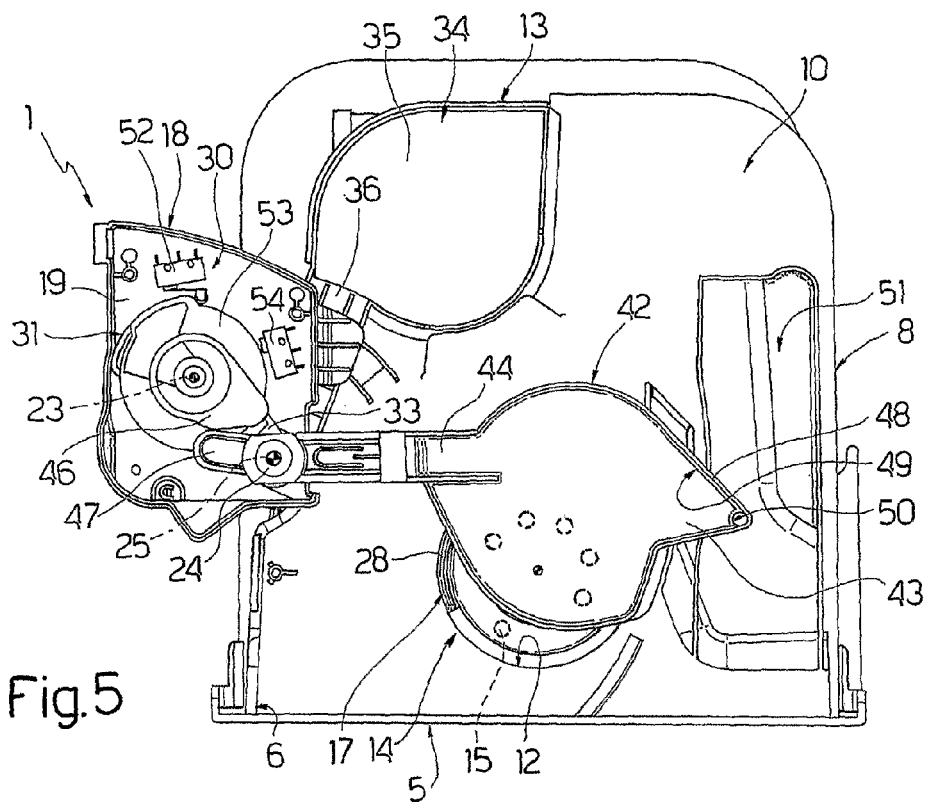
Figure 6:
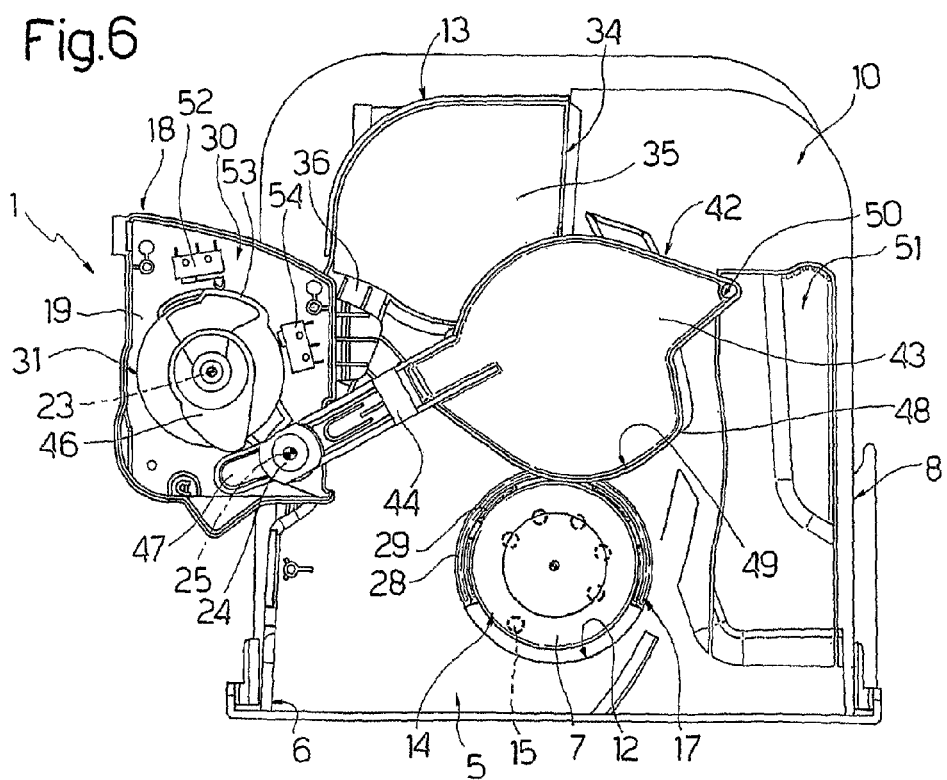
Figure 10:
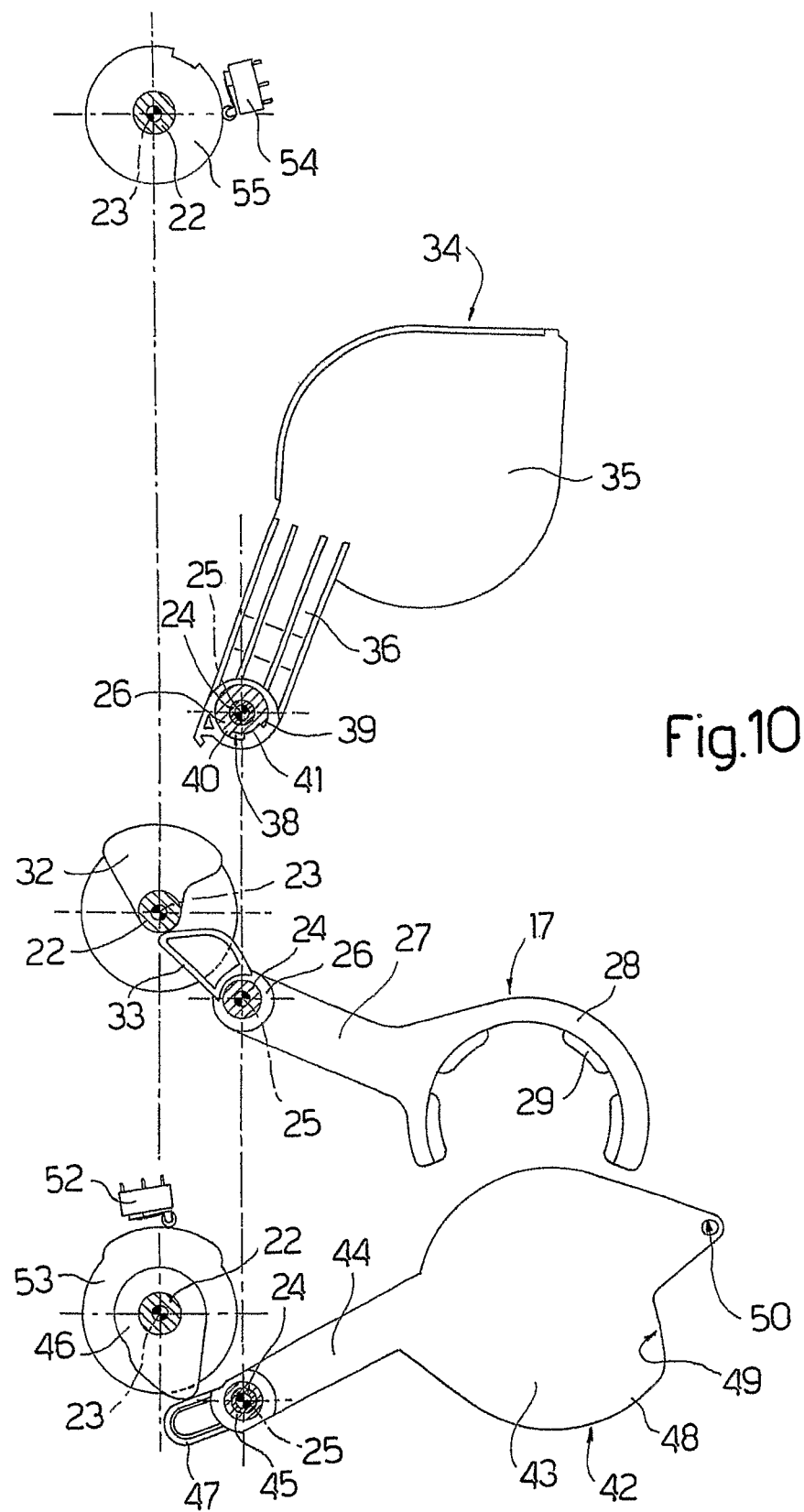

Guard device 42 comprises a plate 43 larger than hole 12 and located above plate 35 and below outlets 15 of nozzles 16; and a supporting arm 44, a free end of which, with a hole, is fitted to a sleeve 45 fitted in rotary manner to pin 24, above sleeve 26, and rotated, in use, about axis 25 by drive 18 to swing guard device between a normal closed position closing hole 12 (FIGS. 3 and 7) and in which plate 43 faces hole 12 and separates outlets 15 from compartment 5; a partly open position partly opening 12 (FIG. 5) and in which plate 43 only opens a portion of hole 12 facing an outlet 15, normally a hot-water outlet 15; and a fully open position fully opening hole 12 (FIGS. 6 and 10) and in which plate 43 fully opens hole 12, so outlets 15 all communicate directly with compartment 5.

Guard device 42 is swung between the above closed and open positions by drive 18 by means of cam transmission device 31, which accordingly comprises a disk cam 46 integral with cam 32 and fitted with it to shaft 22 to rotate about axis 23 and control a cam follower 47 connected rigidly to arm 44, on the opposite side of axis 25 to arm 44.

Besides protecting nozzles 16, guard device 42 also serves to collect any liquid and/or powder issuing from outlets 15 after the dispensing stage. For which purpose, on the side facing outlets 15, plate 43 has a raised peripheral edge 48 defining, with plate 43, a tray 49 which, when plate 43 is in the closed position, communicates, via a hole 50 through plate 43, with a drain cavity 51 formed in top wall 10 to drain the liquid into a removable container (not shown) inside casing 2.

As shown in FIG. 2, in addition to the central control unit (not shown), control unit 30 controlling drive 18 also comprises a dispensing switch 52, which is activated by a disk cam 53 interposed between and integral with cams 32 and 46 to rotate, together with cams 32 and 46, about axis 23.

Control unit 30 also comprises a start switch 54 located between bottom housing 19 and top housing 20, and activated by a disk cam 55 fitted to shaft 22.

Operation of machine 1 will now be described as of a rest or start configuration shown in FIGS. 3 and 7, in which cup-holder 17 is empty and in the rest and mixing position at mixing station 14; shutter 34 is in the closed position closing hole 11; guard device 42 is in the closed position closing hole 12; and both dispensing switch 52 and start switch 54 are off.

Upon the user selecting a beverage, control unit 30 activates motor reducer 21 to rotate shaft 22 and, hence, cams 32, 46, 53, 55 about axis 23.

Figure 4:
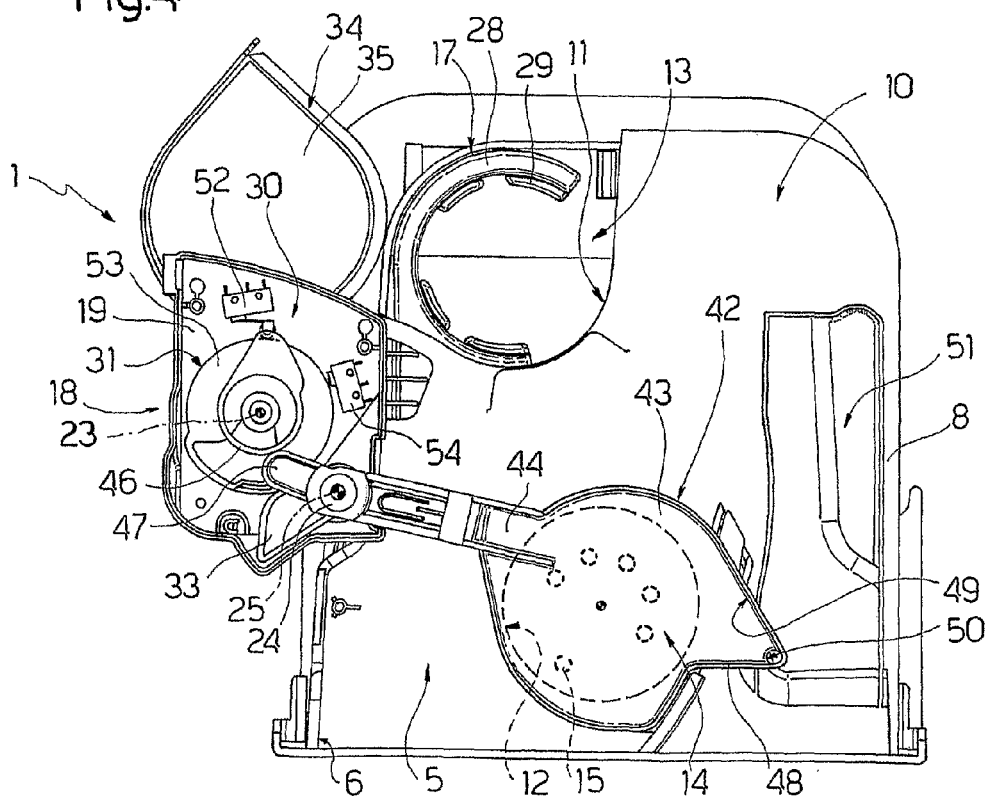

More specifically, as shown in FIGS. 4 and 8, rotation of cam 55 activates start switch 54, which signals to the central control unit (not shown) the start of the operating cycle; and, by means of cam follower 33, rotation of cam 32 rotates cup-holder 17 about axis 25 towards feed station 13, thus simultaneously moving shutter 34, as described above, into the open position opening hole 11, and the cup-holder stops in the receiving position to receive a cup 7 fed downwards through hole 11.

Cam 46 is designed so that, throughout this stage, in which shaft 22 rotates continuously, guard device 42 remains in the closed position closing hole 12. Dispensing switch 52 remains off, and start switch 54 remains on.

Figure 9:
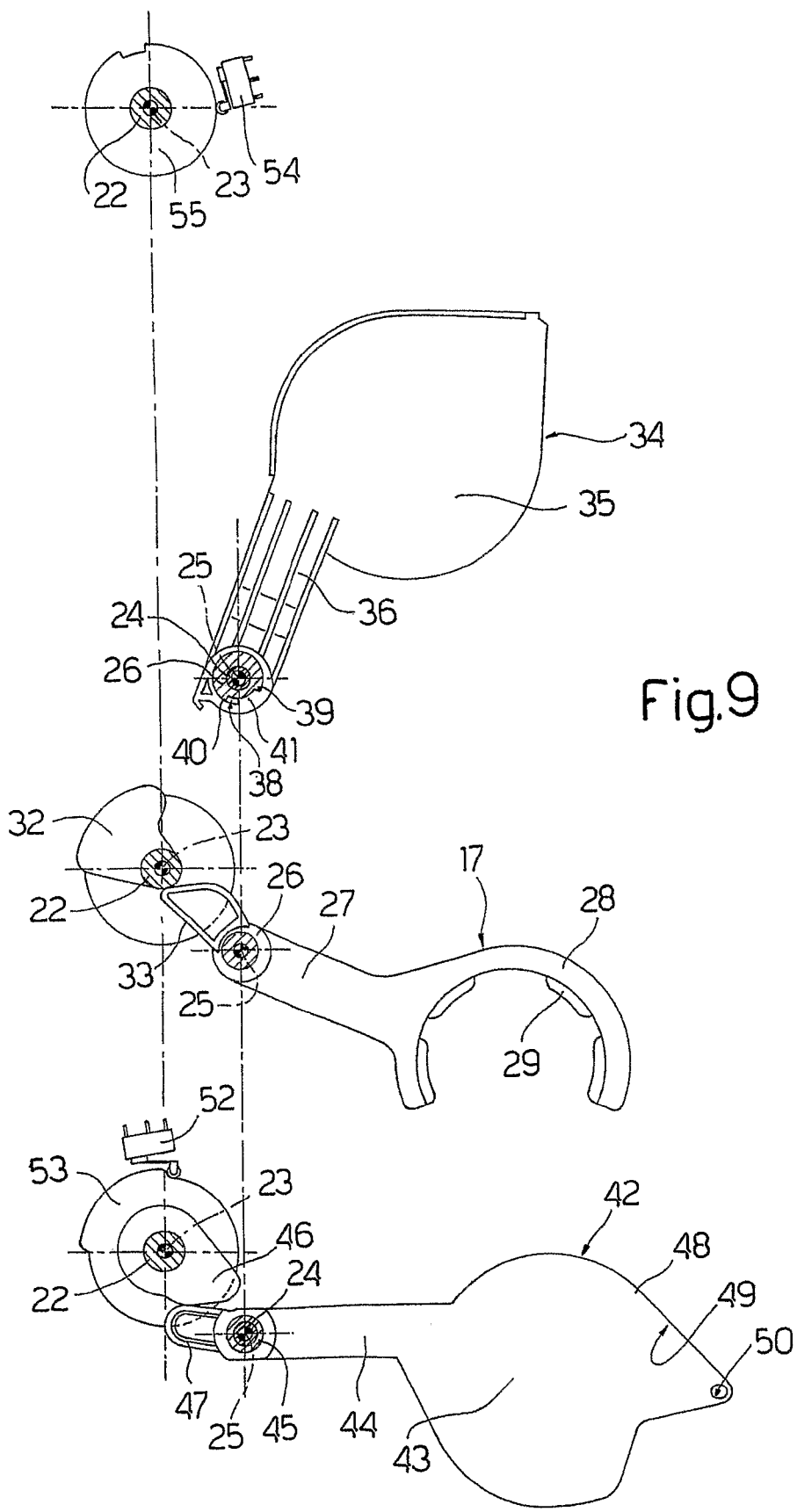

As shown in FIG. 9, on receiving cup 7, cup-holder 17 is returned, by the continuous rotation of shaft 22 and the design of cam 32, to the rest and mixing position, thus simultaneously returning shutter 34 to the closed position closing hole 11.

At this point, cam 46, acting on cam follower 47, rotates guard device 42 about axis 25 into the open position opening hole 12; and, at the same time, cam 53 activates dispensing switch 52.

After switch 52 is activated, control unit 30 keeps motor reducer 21 running for a given time interval depending on the type of beverage selected. The length of the time interval, after which motor reducer 21 is turned off, determines in fact the partly or fully open position of guard device 42, so only the outlet/s 15 involved in dispensing the selected beverage communicate with compartment 5.

Once the beverage is dispensed, motor reducer 21 is started again. Cam 46 moves guard device 42 into the closed position, cam 53 turns off dispensing switch 52, and cam 55 turns off start switch 54, which indicates to the central control unit (not shown) that the operating cycle is completed and that motor reducer 21 can be turned off. At which point, cup 7 can be removed by the user from cup-holder 17 stationary in the rest and mixing position.

The invention claimed is:

1. A beverage vending machine comprising:
   a pickup compartment accessible from the outside and having a beverage mixing station;
   beverage dispensing means having at least one outlet located at the mixing station in a fixed position facing said pickup compartment;
   a first member for feeding a cup into position beneath said outlet;
   a second member, which is a guard member for protecting the outlet, and is movable, past the outlet and with respect to the first member, to and from a cutoff position separating the outlet from the pickup compartment;

a drive; and transmission means interposed between the drive and the second member to move the second member to and from said cutoff position; wherein the transmission means comprises a cam transmission means.

2. A machine as claimed in claim 1, wherein the drive comprises an output shaft rotating about a first axis; the second member rotates about a second axis parallel to the first axis; and the transmission means comprise a first cam fitted to said shaft, and a first cam follower integral with the second member and cooperating with the first cam to move the second member about the second axis and to and from said cutoff position as a function of the angular position of the first cam about the first axis.

3. A machine as claimed in claim 1, wherein the first member is movable, inside the pickup compartment, to and from the mixing station to feed one cup at a time into position beneath said outlet.

4. A machine as claimed in claim 2, wherein the first member rotates about the second axis, inside the pickup compartment, to and from the mixing station to feed one cup at a time into position beneath said outlet, and the transmission means comprises a second cam fitted to said shaft, and a second cam follower integral with the first member to move the first member, about the second axis, between the mixing station and a cup-receiving station, as a function of the angular position of the second cam about the first axis.

5. A machine as claimed claim 1, wherein the pickup compartment comprises a top wall having a first opening through which said outlet communicates with the pickup compartment; the second member being movable to and from a closed position closing the first opening.

6. A machine as claimed in claim 5, wherein the second member comprises a closing body larger than the first opening and movable to and from said closed position in a plane substantially parallel to the top wall.

7. A machine as claimed in claim 6, wherein the closing body is cup-shaped, and is positioned with its concavity facing said outlet to define a tray for collecting any material issuing from said outlet upon completion of a dispensing operation; the tray having a through hole for draining off the collected material.

8. A machine as claimed in claim 5, wherein the second member is located on the opposite side of the top wall to the pickup compartment.

9. A machine as claimed in claim 1, wherein the pickup compartment comprises an access opening allowing access by the cups to the pickup compartment; the machine comprising a third member movable to and from a closed position closing said access opening.

10. A machine as claimed in claim 9, wherein the pickup compartment comprises a top wall having a first opening through which said outlet communicates with the pickup compartment; the second member being movable to and from a closed position closing the first opening; the access opening being a second opening formed through the top wall.

11. A machine as claimed in claim 2, wherein the pickup compartment comprises a top wall having a first opening through which said outlet communicates with the pickup compartment; the second member being movable to and from a closed position closing the first opening; the access opening being a second opening formed through the top wall; and the third member rotating about the second axis, and being connected angularly to the first member by a joint, so that movement of the first member to and from the mixing station moves the third member to and from said closed position.

12. A machine as claimed in claim 11, wherein the joint comprises a tooth on the third member; and a slot movable with the first member about the second axis and engaged in sliding manner by the tooth.

13. A machine as claimed in claim 2, and comprising a control unit comprising a central control unit for controlling the drive, and first indicating means for indicating the angular position of the second member about the second axis.

14. A machine as claimed in claim 13, wherein said first indicating means comprise a third cam fitted to said shaft; and a switch connected to the central control unit and activated by the third cam.

15. A machine as claimed in claim 13, wherein the control unit comprises second indicating means for indicating a start or rest position of the machine; the second indicating means comprising a fourth cam fitted to said shaft, and a switch connected to the central control unit and activated by the fourth cam.

\* \* \* \* \*

UNITED STATES PATENT AND TRADEMARK OFFICE
CERTIFICATE OF CORRECTION

PATENT NO. : 8,807,179 B2
APPLICATION NO. : 12/992600
DATED : August 19, 2014
INVENTOR(S) : Brusadelli et al.

It is certified that error appears in the above-identified patent and that said Letters Patent is hereby corrected as shown below:

In the Claims

In Column 5, Claim 5, Line 30, delete "claimed claim" and insert -- claimed in claim --, therefor.

In Column 6, Claim 13, Line 29, delete "and comprising" and insert -- further comprising --, therefor.

Signed and Sealed this
Fourth Day of August, 2015

Michelle K. Lee
*Director of the United States Patent and Trademark Office*